United States Patent [19]

Siepmann

[11] 4,243,204
[45] Jan. 6, 1981

[54] VALVE HOUSINGS MADE FROM STEEL, ESPECIALLY FOR GATE VALVES

[75] Inventor: Walter Siepmann, Warstein-Belecke, Fed. Rep. of Germany

[73] Assignee: Forval S.A., Fribourg, Switzerland

[21] Appl. No.: 13,525

[22] Filed: Feb. 21, 1979

[30] Foreign Application Priority Data

Feb. 23, 1978 [DE] Fed. Rep. of Germany ....... 2807740

[51] Int. Cl.³ ......................... F16K 27/10; F16K 3/00
[52] U.S. Cl. .................................... 251/366; 251/329; 29/157.1 R
[58] Field of Search ................... 29/157.1 R; 251/366, 251/329; 219/121 EB, 121 EM

[56] References Cited

U.S. PATENT DOCUMENTS

| 1,598,244 | 8/1926 | Crook | 251/329 |
| 2,868,495 | 1/1959 | Lucas | 29/157.1 R |
| 3,197,175 | 7/1965 | Siepmann | 251/329 |
| 3,473,785 | 10/1969 | Siepmann | 251/366 |
| 3,975,810 | 8/1976 | Siepmann | 29/157.1 R |

FOREIGN PATENT DOCUMENTS 16440 9/1956 Fed. Rep. of Germany ........... 251/329

*Primary Examiner*—Martin P. Schwadron
*Assistant Examiner*—A. Michael Chambers
*Attorney, Agent, or Firm*—Michael J. Striker

[57] ABSTRACT

A valve housing made from steel, especially for gate valves, has a central housing part provided in opposite walls with frustoconical openings tapering in outward direction and being aligned along a common axis and a pair of connecting sockets having inner chamfered end faces of the same cone angle as the aforementioned openings and aligned along the common axis with the latter. The connecting sockets are connected at the aforementioned openings to the opposite side walls of the central housing part by a pair of annular connecting members having each a cross-section in the form of a substantially right-angled triangle along frustoconical outer surfaces of the connecting members in which this frustoconical surface has a generatrix which is formed by the hypotenuse of the triangle, in such a manner that the cylindrical inner surfaces of the connecting members form continuations of the inner cylindrical surface of said connecting sockets and the inner annular surfaces of the connecting members facing a central plane of symmetry of the valve housing form directly or indirectly seating faces for a closer member to be mounted in the valve housing.

12 Claims, 6 Drawing Figures

VALVE HOUSINGS MADE FROM STEEL, ESPECIALLY FOR GATE VALVES

BACKGROUND OF THE INVENTION

The present invention relates to a valve housing made from steel, especially for gate valves, in which the valve housing is composed of a plurality of housing elements which are connected by welding, especially by electron beam welding. Such a valve housing includes a central housing part formed in opposite walls thereof with openings aligned along a common axis, a pair of coaxial connecting sockets, as well as connecting members connecting the connecting sockets to the central housing part and having inner annular surfaces facing a central plane of symmetry of the valve housing and forming seating faces or carrier faces for seating rings for a closer member to be mounted in the valve housing.

Various suggestions for the constructive design and the manner of assembly of such valve housings are known in the art. All these known suggestions aim in principle to correlate the different requirements for such valve housings, which, on the one hand, should satisfy the proper function and strength of the valve housing, and, on the other hand, the most simple and, therefore, inexpensive production thereof, by means of an economical compromise in an optimum manner with each other, so that the valve housing may be constructed with the smallest possible dimensions.

These conditions are valid for valve housings in which the central housing part is pressed from sheet metal and the connecting socket, for the connection of the valve housing with conduits, consist of standard tube sections, as well as for such valve housings in which the individual parts are forged in dies. These conditions are basically also independent of whether the valve housings are constructed for a plate-shaped closer member or for closer members of different configurations.

Whereas the problems resulting from the configuration of the central housing parts and their composition of separate parts can be considered as being solved in a satisfactory manner, regardless whether the various parts of the housing are pressed from sheet metal or formed by forged parts, and also independent whether the valve housing is constructed for cooperation with a closer member in form of a plate or for closer members of different configuration, an unsatisfactory solved problem for the economical production resides in a suitable weld connection between the central housing part and the connecting sockets which eventually are provided with flanges at the outer ends. This difficulty resides mainly in that any kind of used weld connection has direct influence onto the constructive design of the valve housing and inversely certain function determined characteristics of the respective valve housing influence also the position and kind of a suitable, automatically produceable welding connection. This holds true for conventional welding methods, as well as for electron beam welding lately developed and especially suitable for welding the parts of valve housings to each other.

If, for instance, the welding connection between the central hosuing part and the connecting sockets is carried out by conventional automatic arc welding, then the lead-in of the welding wire, respectively the electrode, the protecting gas and the eventually necessary welding powder is difficult at this location in which the cover flange of the central housing part and the flanges at the outer ends of the connecting sockets form between themselves a relatively small gap. It is, therefore, necessary to keep the gap so large that the supply of wire, powder or gas, which is usually carried out through a tube, can still be provided without hinderence through the gap between the cover flange and the connecting flange. Since the flange diameters at valve housings are often standardized, the gap between cover flange and connecting flange can only be enlarged by moving the cover flange of the central housing part in direction away from the outer periphery of the flange at the outer end of the connecting socket. This will, however, result that the interior of the central housing part has to be chosen greater, especially deeper, than necessary and in the event that the central housing part is a hollow forged part it has to be made greater than necessary, respectively desirable.

Especially with central housing parts which are forged in dies, these forging dies will thus become more complicated and liable to wear. The necessary forging machines need in this case be larger and heavier than would be otherwise necessary. Especially the strokes of crank presses for die forging have to be correspondingly larger dimensioned. At the same time, the stroke of mandrels used has to be enlarged, which in turn may lead to an undesired displacement of such mandrels.

In order to facilitate the welding of the connecting sockets to the central housing part it is already known to provide the openings in the central housing part with an appropriate bead. In later developed constructions the central housing part has substantially flat side walls provided with openings into which the connecting sockets are welded. Thereby the connecting sockets form, however, relatively complicated forged parts which are provided at the inner ends with enlargements and smooth tubes can only be welded into the openings of the central housing part if they are constructed with heavier walls than would be necessary for operating reasons.

In the known constructions the welding seams between the central housing part and the connecting sockets are preferably simple annular seams similar to such annular seams which are used for the welding connection of tube sections. Only such simple annular seams may be produced automatically, especially also when electron beam welding is used. They have also the advantage that the perfect formation of the welding seam can be subsequently ascertained by X-ray examination.

These known constructions have, however, the decisive disadvantage that, in order to carry out a perfect welding, the dimensions of the housing in view of the necessary large distance between the housing flanges on the one hand, and the connecting socket flanges on the other hand, must be chosen essentially greater than would be necessary for the proper function and rigidity of such a valve housing.

SUMMARY OF THE INVENTION

It is an object of the present invention to provide a valve housing of the kind mentioned above and which avoids the disadvantages of such valve housing known in the art.

It is a further object of the present invention to provide a valve housing of the aforementioned kind in which a pair of connecting sockets may be automatically welded to a central housing part, each with a single annular weld seam, in a perfect manner without an unnecessary enlargement of the dimensions of the valve housing.

In order to accomplish the desired result, the valve housing according to the present invention is characterized in that the central housing part is connected to a pair of connecting sockets by a pair of annular connecting members which have a cross-section substantially in the form of a right-angled triangle, the hypotenuse of which forms the generatrix of the frustoconical outer surface of the connecting member which is welded along a first portion of its length extending over the large diameter region of the outer surface over the whole circumference to the inner frustoconical surface of the respective opening formed in opposite side walls of the central housing part and which is welded along a second portion of its length extending over the smaller diameter region of the outer surface to the inner tapering end face of the respective connecting socket, whereby the inner annular surface of the connecting member formed by one of the shorter sides of the triangle forms a continuation of the inner surface of the respective connecting socket and the other shorter side of the triangle forms the generatrix of an annular surface which is located in the central housing part and faces the central plane of symmetry of the latter.

To manufacture the valve housing according to the present invention, the central housing part is provided in the region of opposite substantially planar walls with conical bores, the larger diameters of which are located at the inner surface of the walls of the central housing part, whereas the smaller diameter of which is located on the outer surface of the substantially planar walls of the central housing part. The annular connecting members are then placed respectively in these conical bores provided in the opposite side walls of the central housing so that the outer frustoconical surfaces of the annular connecting members abut against the surfaces formed by the conical bores, while small diameter end portions of the outer frustoconical surfaces of the connecting members project beyond the outer surfaces of the side walls of the central housing part. The connecting sockets are then, with correspondingly tapered end faces, pushed onto the projecting portions of the outer frustoconical surfaces of the annular connecting members.

When the central housing part and the two connecting sockets are in this way properly located with respect to each other by means of the frustoconical outer surfaces of the two annular connecting members, then the two connecting sockets, the two annular connecting members and the central housing part are clamped with an appropriate device in exactly fixed position with respect to each other. If now the thus-assembled elements of the valve housing are rotated about the common axis of the opposite connecting sockets, an electron beam, extending under an angle equal to the angle at which the hypotenuse of the triangular cross-section includes with the common axis of the connecting sockets, can weld during one revolution of the valve housing about the aforementioned axis the central housing part with two connecting sockets by means of the annular connecting members in a homogeneous manner perfectly to each other. The aforementioned angle which the hypotenuse of the triangular cross-section of each connecting member includes with the common axis of the two connecting sockets may be between 35° and 45°, preferably about 40°.

Even though such annular connecting members, according to the present invention as connecting parts between the central housing part and the two connecting sockets may not only be used for electron beam welding, but also for known other welding methods, the welding of the various parts of the valve housing by means of electron beams starting from the interior of the connecting socket constitutes a preferred approach.

From the above it will be evident that the present invention is basically independent whether the various parts of the valve housing are formed from sheet metal or from forged parts, since the simplification of connecting the parts by the use of the annular connecting members according to the present invention is in either case obtainable. However, special advantages are derived for valve housings in which the parts thereof are constituted by forged parts and especially in the production of gate valve housings.

The valve housing according to the present invention offers especially in connection with the use of electron beam welding considerable advantages as compared to valve housings according to the prior art.

Since the electron beam welding of the central housing part, the two annular connecting members as well as the two connecting sockets starts in the interior of the connecting socket, it is possible to hold the interior of the central housing part essentially smaller, because the cover flange of the central housing part can be placed much closer to the connecting flanges of the connecting sockets than is possible in the constructions according to the prior art. Accordingly, the dimensions in the interior of the central housing part can be made only as large as necessary for the function of the housing, for instance a housing for a gate valve, and in connection therewith according to the guide of the valve plate.

The connecting sockets, which usually are provided with flanges at the outer ends, constitute thereby simple forged parts, since during the forging only a smooth tubular extension has to be formed from the respective flange. The tubular extension may be produced with relatively small uniform wall thickness. Thereby no detrimental material accumulations are created at the locations of connecting the sockets with the central housing part, which would lead to a non-uniform flux of force at the transistors of connecting sockets to the central housing part, as was usually unavoidable with the known constructions.

The annular connecting members constitute likewise simple forged parts which, clamped at the inner surface thereof, may be machined with a single clamping in a simple manner. Special advantages are derived if the central housing part is forged integral in a die or extruded. Whereas this way of production has lead up to now to insufficient strength characteristics between cover flange and the connecting sockets welded to the central housing part, the present invention permits to place the cover flange essentially closer to the flanges on the connecting sockets to thereby hold the dimensions of the valve housing smaller, while essentially improving the strength characteristics thereof, so that a valve housing having the same wall thickness as such housings of the prior art can be subjected to essentially higher pressures.

The two weld seams, each of which is carried out by electron beam welding of the outer frustoconical surfaces of the annular connecting members, permit also in a simple manner to ascertain the perfect weld by subsequent X-ray examination, whereby it is only necessary that the X-ray films are placed into the interior of the connecting sockets.

Due to the breakdown in simpler drop forged parts, simpler and also smaller forging presses and forging hammers are necessary and in addition the weight for the forged parts is reduced in an advantageous manner.

The entrance angle of the electron beam from the connecting socket into the weld seam should be smaller than 45°, but not essentially smaller than 40°. In this way the larger part of the weld seam surface will be located in the connecting socket and the smaller part in the central housing part. This is advantageous because the smaller part of the weld seam surface in the central housing part is only stressed to a very small extent, in any way essentially smaller than the part of the weld seam surface which is located in the connecting socket.

Finally, an essential further advantage of the present invention consists in that the metallurgical conditions of the welding seam can be essentially influenced by the material of the welded annular connecting member. Thus, it is for instance possible to manufacture the central housing part and the connecting sockets from normal steel of the quality C22.8, if the annular connecting members have advantageous characteristics for the electron beam welding, especially with regard to narrow limits of the sulfur and aluminum content thereof. Especially advantageous results will be obtained if the annular connecting members are formed of stainless steel, or the like, while the connecting sockets and the central housing part are formed from normal steel of the quality C22.8.

Further essential advantages are derived if according to a further feature of the invention the central housing part and the connecting sockets connected to each other by the welded annular connecting members provide between their adjacent edges at the outer frustoconical surface of the annular connecting members a small, gap-shaped distance, so that at this location a usual weld seam surface may be formed, and if the inner surface of the annular connecting member has a slightly smaller diameter than the inner diameter of the connecting socket. Experience has shown that in this way through a small inwardly projecting funnel-shaped projection of the annular connecting member entrance of the electron beam into the welding gap is facilitated.

According to a further essential characteristic of the invention the annular connecting members form, at least indirectly, carries for seating rings for a closer member to be mounted in the housing, for which purpose the faces of the annular connecting members serve which are directed to a central plane of symmetry of the housing.

If the housing is to be used for a gate valve, then the end faces of the annular connecting members which are directed toward the central plane of symmetry of the housing carry preferably correspondingly inclined seating rings for cooperation with the wedge-shaped closer member. These seating rings are preferably integrally formed with the annular connecting members, but eventually they may be constructed separated therefrom and placed in corresponding cutouts of the annular connecting members and connected thereto, for instance by screws.

In this way it is possible to exactly machine the annular connecting members before they are placed in the conical bores of the central housing part to form the seat rings thereon or, for instance, also to armor the same by means of hard facing.

Since the annular connecting members forming at the same time the seat rings are mounted in the interior of a corresponding conical bore in the wall of the central housing part, no undue stresses will be imparted thereto upon opening of the gate valve, for instance by pressure loading through the medium under pressure passing through the valve housing.

If the housing is to be constructed for an angle valve, then the end face of one of the annular connecting members which is directed towards the interior of the housing is provided with a tubular elbow, the upper free end face of which normal to the central plane of symmetry forms, at least indirectly, a seating ring for a closer member to be mounted in the valve housing. In this case the one annular connecting member and the elbow may be integrally formed with each other.

The housing of the present invention is also suitable for ball valves. In this case, the end faces of the annular connecting members, which are directed toward a central plane of symmetry of the housing, serve to support a seating ring cooperating with the spherical surface of the closer member.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
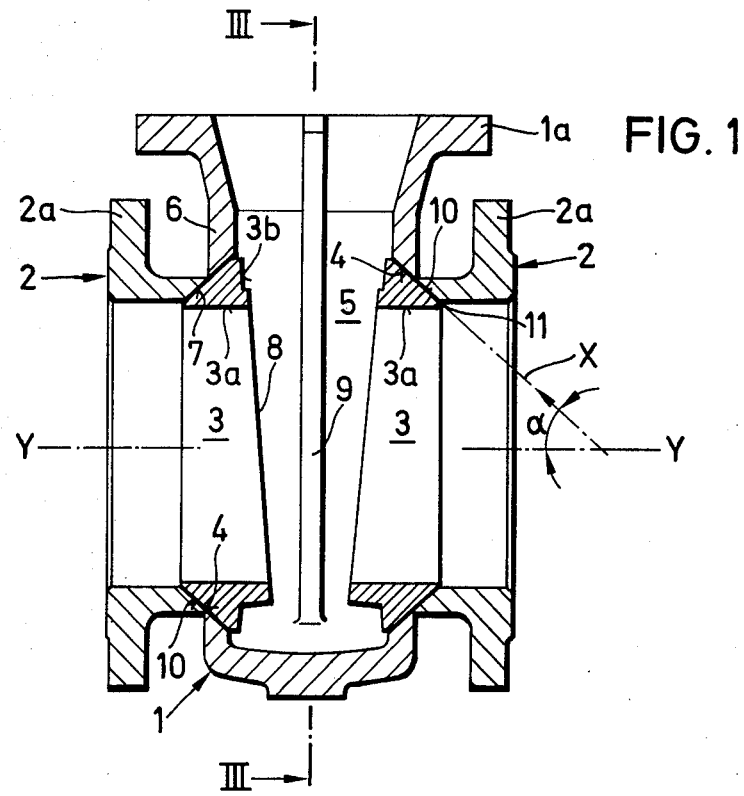
FIG. 1 is a vertical central cross-section through a housing according to the present invention for a gate valve.
Figure 2:
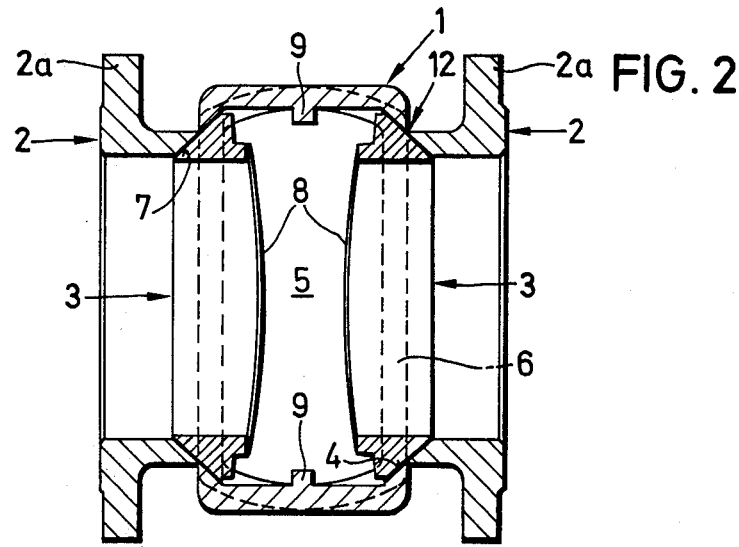
FIG. 2 is a horizontal cross-section through the housing shown in FIG. 1.
Figure 3:
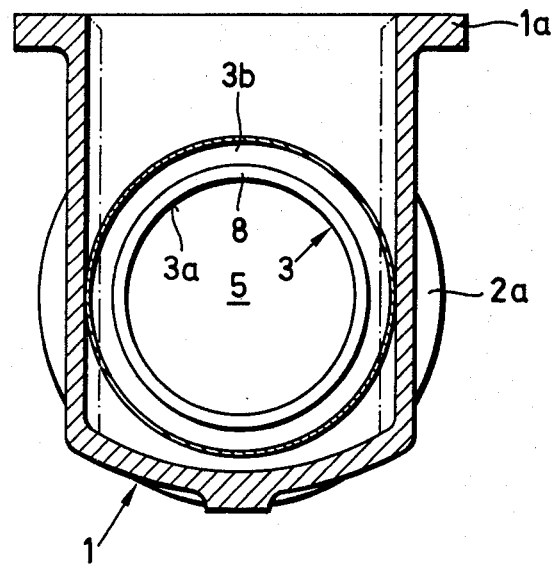
FIG. 3 is a cross-section taken along the line III—III of FIG. 1.

Referring now to the drawing, and more specifically to the embodiment illustrated in FIGS. 1-3, which show a valve housing for a gate valve, it will be seen that this valve housing comprises a central housing part 1, two connecting sockets 2 and two annular connecting members 3 which are welded to the other components of the housing.

The central housing part 1 is provided with a cover flange 1a and is constituted by a drop-forged component. Likewise the connecting sockets 2, provided at the outer ends thereof with flanges 2a, are forged parts.

The opposite substantially planar walls of the central housing part 1 are provided with conical bores 4, the larger diameters of which are directed toward the interior 5 of the housing, whereas the smaller diameters of which are located in the region of the outer surfaces of the planar walls 6.

The connecting sockets 2 are provided at the inner ends thereof with corresponding conical bores, respective chamfers 7.

The two annular connecting members 3, which are formed from stainless steel, have each a cross-section substantially in the form of a right-angled triangle in which the hypotenuse of the triangle forming the generatrix of the outer frustoconical surface 10 has the same inclination to the longitudinal axis Y—Y of the housing as the coinicity of the chamfers 4 of the bores in the housing walls and that of the chamfers 7 at the inner ends of the connecting sockets 2. They form with the longitudinal axis Y—Y and angle alpha of about 40°.

The arrow X shown in FIG. 1 indicates the electron beam, if the annular connecting members are welded to the central housing part and the connecting sockets by electron beam welding.

As can be seen from FIGS. 1 and 2, one of the shorter sides 3a of each annular connecting member 3 is arranged in such a manner that it forms an axial continuation of the cylindrical inner surface of the respective connecting socket 2, whereas the other shorter side 3b of the right-angled triangle is located within the central housing part 1 and faces the interior 5 of the housing.

In the illustrated embodiment, a seating ring 8 is integrally formed on each of the shorter sides 3b of the annular connecting members 3. The free end faces of the two seating rings are inclined with respect to each other corresponding to the wedge-shaped form of the non-illustrated closer member of the gate valve.

The central housing part 1 is also provided with a pair of guide ridges 9 for guiding the non-illustrated closer member.

The assembly of the above-described valve housing can be easily visualized from FIGS. 1 and 2. At first the annular connecting members 3 are inserted into the conical bores 4 on opposite sides of the central housing part 1. When the outer frustoconical surfaces 10 of the two annular connecting members 3 abut against the conical bores 4 in the opposite housing walls 6, a portion of each frustoconical surface 10 will project beyond the outer surface of the respective side wall 6. Thereafter, the two connecting sockets 2 are placed with their chamfered ends 7 onto the projecting portions of the frustoconical surfaces 10 of the connecting members 3.

In this way the components of the housing are properly positioned with respect to each other and may be clamped in this position by a non-illustrated device.

Subsequently thereto, the housing is rotated about the axis Y—Y, whereby an electron beam X from the interior of each connecting flange impinges under an angle of about 40° the interengaging conical surfaces, so that after one revolution of the valve housing about the aforementioned axis the components thereof and homogeneously welded to each other by electron beam welding.

As shown in FIG. 1, the inner diameter of each annular connecting member 3 is slightly smaller than the inner diameter of the corresponding connecting socket 2. In this way, a small funnel-shaped projection, respectively gap, is formed at 11 which facilitates proper entrance of the electron beam into the welding gap.

The adjacent end edges of the central housing part 1 and the two connecting sockets 2 form at 12 (FIG. 2) small gaps between each other, hardly visible in the drawing, which permit that at this location an outer welding seam surface will be formed.

The aforementioned angle alpha is preferably smaller than 45° and preferably in the order of about 40°, which will assure that the welding connections of the connecting sockets 2 with the annular connecting members 3 extend over larger areas than the connecting of the central housing part 1 with the annular connecting members 3. This means that the welding connection, respectively the width of the weld seam in the entrance region of the electron beam X is greater than in that region in which the central housing part 1 is connected with the annular connecting members 3.

Figure 4:
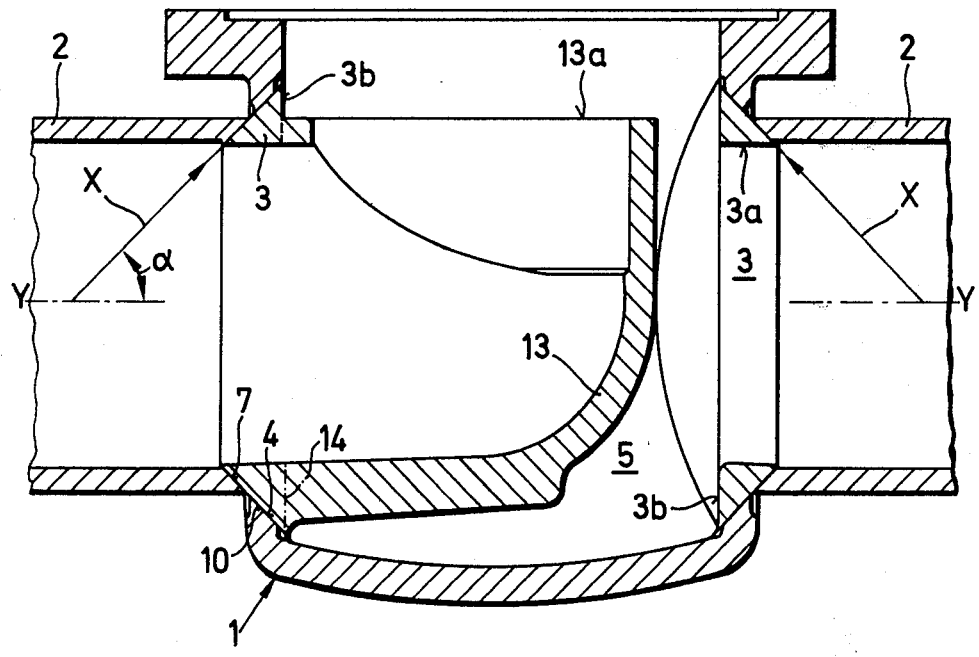
FIG. 4 is a vertical central cross-section through an angle valve housing.
Figure 5:
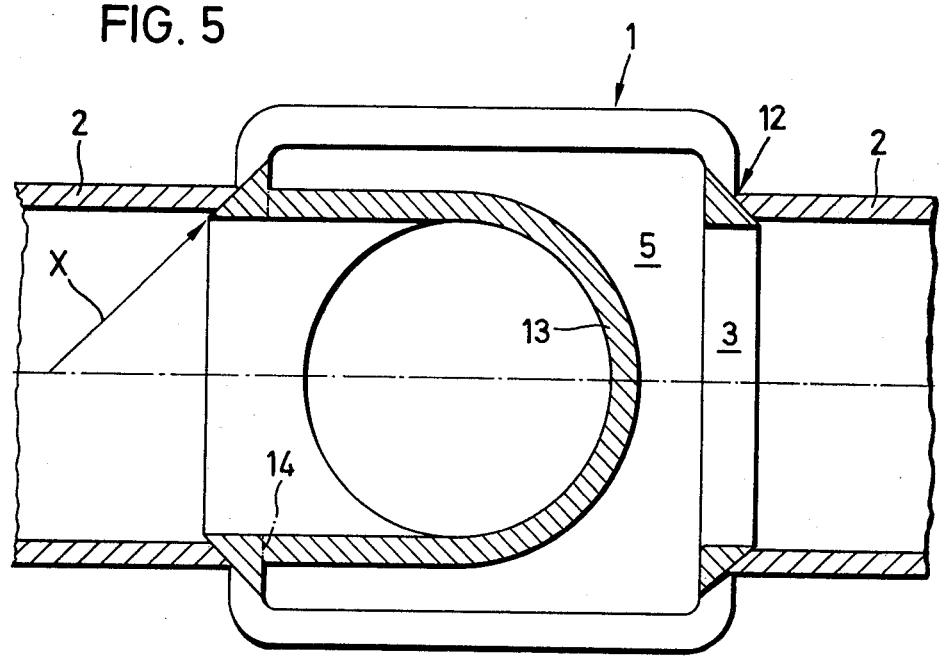
FIG. 5 is a horizontal central cross-section through the valve housing shown in FIG. 4.

The relationship of the various components of the annular valve housing as illustrated in FIGS. 4 and 5 are substantially the same as described above in connection with the gate valve housing illustrated in FIGS. 1-3.

However, in the embodiment shown in FIGS. 4 and 5, the annular connecting member 3, shown at the right side of FIG. 4, does not serve as carrier for a seating ring, but a tubular elbow 13 is connected to the end face 3b of the annular connecting member 3, shown at the left side of FIG. 4, and the upper free end face of the elbow 13 forms the seating rings 13a of a non-illustrated closer member.

The elbow 13 is in the illustrated embodiment welded at 14 to the end face 3b of the left annular connecting member 3, however, it should also be possible to form the elbow integral with this annular connecting member.

Figure 6:
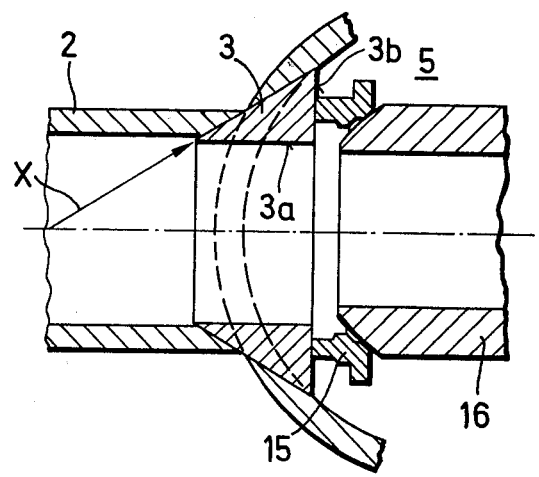
FIG. 6 is a partial cross-section through another housing for a valve with a part spherical closer member.

The relationship of the various components of the valve housing schematically and partly illustrated in FIG. 6 for a closer member with a part-spherical surface is substantially the same as in the two above-described embodiments.

Deviating from the previously-described embodiments, however, the end faces 3b of the two annular connecting members 3 which face the interior of the housing serve to support a preferably resiliently constructed sealing ring 15 which is adapted to engage the part-spherical surface of a rotatable closer member 16.

From the above, it will be evident that the invention may likewise be used for valve housings and having components pressed from sheet metal, in which the central housing part has throughout a uniform wall thickness and in which also the two connecting sockets may be formed from tube sections of equal wall thickness. If in such a housing formed from sheet metal it is necessary that the connecting sockets are welded to the planar surfaces of the central housing part, then the, for reason of rigidity absolutely necessary reinforcement, is provided by the welded annular connecting members which project outwardly from the planar walls of the central housing part, so that the tubular connecting sockets may be securely welded to these connecting members.

It will be understood that each of the elements described above, or two or more together, may also find a useful application in other types of valve housings from steel differing from the types described above.

While the invention has been illustrated and described as embodied in a valve housing made of steel, especially for gate valves, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A steel valve housing comprising a central housing part having an axis and formed in opposite walls thereof with axially aligned openings defined by inner frustoconical surfaces tapering in outward direction at a predetermined angle to the axis; a pair of connecting sockets axially aligned with said openings of the housing part and having inner end faces which taper at the same angle to the axis of the housing part and in the same direction as said frustoconical openings of the housing part, and with axially extending annular inner surfaces axially aligned with each other and with the openings of the housing part; and a pair of connecting members having each a cross-section substantially in the form of a right-angle triangle connecting said connecting sockets to said central housing part, the hypotenuse of the triangular cross-section of each connecting member forming the generatrix of the frustoconical outer surface inclined at the same angle to the axis of the housing part, the frustoconical outer surface of each of the connecting members having a first portion of its length which extends over the large diameter region of the frustrum and is welded at said angle over the whole circumference to the inner frustoconical surface of the respective opening of the housing part, the frustoconical outer surface of the connecting member having a second portion of its length which extends over the smaller diameter region of the frustrum and is welded also at said angle over the whole circumference to the inner tapering end face of the respective socket, each of the connecting members having an axially extending inner annular surface formed by one of the sides of the triangle and forming the continuation of the inner annular surface of the respective socket, each of the connecting members having a transversely extending further annular surface formed by the other side of the triangle and located within the housing part so as to face a central plane of symmetry of the latter.

2. A valve housing as defined in claim 1, wherein the imaginary apex of the outer frustoconical surface of each of said connecting members is located on the common axis of said connecting sockets, and wherein the generatrix forming said outer conical surface of each connecting member includes with said common axis an angle alpha of 35°–45° to facilitate welding of said connecting members to said central housing part and said connecting members by electron beam welding.

3. A valve housing as defined in claim 2, wherein said angle alpha is 40°.

4. A valve housing as defined in claim 1, wherein said central housing part and said connecting sockets connected by said connecting members have at the outer frustoconical surface of the latter annular edges which are spaced a small distance from each other.

5. A valve housing as defined in claim 1, wherein the inner surface of each connecting member which forms a continuation of the respective inner surface of the respective connecting socket has a slightly smaller diameter than the latter.

6. A valve housing as defined in claim 1, wherein said annular surface of each connecting member formed by said other side of said triangle forms at least indirectly also a carrier for a seating ring for a closer member to be mounted in said valve housing.

7. A valve housing as defined in claim 6, wherein said annular surface of each connecting member formed by said other side of said triangle is inclined to said central plane of symmetry and constitutes a seating ring for a wedge-shaped closer member to be mounted in said valve housing.

8. A valve housing as defined in claim 6, wherein said seating ring is integral with said connecting member.

9. A valve housing as defined in claim 6, and including a tubular elbow carried by said annular surface formed by said other side of said triangle of one of said connecting members, said tubular elbow having a free end face normal to said central plane of symmetry and forming at least indirectly a seating ring for a closer member to be mounted in said valve housing.

10. A valve housing as defined in claim 9, wherein said tubular elbow is integral with said one connecting member.

11. A valve housing as defined in claim 6, and including a seating ring supported on the annular surfaces of both connecting members which face said central plane of symmetry.

12. A valve housing as defined in claim 11, wherein said seating ring has a sealing face adapted to cooperate with a spherical face of a closure member to be mounted in said valve housing.

* * * * *